United States Patent
Mantripragada et al.

(10) Patent No.: US 11,846,971 B2
(45) Date of Patent: Dec. 19, 2023

(54) UNEXPECTED DEVICE USAGE DETECTION AND ADAPTATION

(71) Applicant: International Business Machines Corporation, Armonk, NY (US)

(72) Inventors: Kondala Rao Radha Ravi Shankara Mantripragada, Visakhapatnam (IN); Sri Harsha Varada, Vizianagaram (IN); Ramesh Naidu Yamalapalli, Visakhapatnam (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/452,451

(22) Filed: Oct. 27, 2021

(65) Prior Publication Data
US 2023/0131293 A1 Apr. 27, 2023

(51) Int. Cl.
*G06F 9/00* (2006.01)
*G06F 9/451* (2018.01)
(Continued)

(52) U.S. Cl.
CPC ............ *G06F 9/453* (2018.02); *G06N 5/04* (2013.01); *G06N 20/00* (2019.01); *G06Q 30/016* (2013.01); *H04L 67/535* (2022.05)

(58) Field of Classification Search
CPC .... G06F 9/453; G06F 3/04812; G06F 3/0482; G06F 3/0484; G06F 3/0488; G06F 1/3206; G06F 16/9577; G06F 16/9035; G06F 11/3438; G06F 9/4451; G06F 2201/865; H04L 67/535; G06Q 30/016; G06Q 30/30; G06Q 40/04; G06N 3/0454; G06N 20/00

See application file for complete search history.

(56) References Cited

U.S. PATENT DOCUMENTS

| 9,450,961 B2 | 9/2016 | Stanasolovich et al. |
| 10,061,289 B2 | 8/2018 | Haghighat-Kashani et al. |

(Continued)

FOREIGN PATENT DOCUMENTS

| CA | 2375611 C | * | 1/2010 | ........... G06F 9/4446 |
| CA | 3051241 A1 | * | 8/2018 | ......... G06F 17/5009 |

(Continued)

OTHER PUBLICATIONS

PCT, Notification of Transmittal of The International Search Report and The Written Opinion of The International Searching Authority, or The Declaration for Application PCT/EP2022/079638 dated May 8, 2023.

*Primary Examiner* — Steven P Sax
(74) *Attorney, Agent, or Firm* — Patterson + Sheridan, LLP

(57) ABSTRACT

A system to provide increased visibility and insight into unexpected usage patterns for electronic devices is described. The utilization analysis system applies a utilization model to device utilization information. The utilization model is also used to determine one or more device usage patterns for the electronic device. These device usage patterns are used to determine an unexpected device utilization where the system responds to the unexpected device utilization with several hardware and software solution proposals to prevent damage to the electronic device and/or enhance the design and development of the electronic device.

20 Claims, 5 Drawing Sheets

(51) Int. Cl.
*H04L 67/50* (2022.01)
*G06Q 30/016* (2023.01)
*G06N 20/00* (2019.01)
*G06N 5/04* (2023.01)

(56) References Cited

U.S. PATENT DOCUMENTS

| | | | |
|---|---|---|---|
| 10,185,934 B2 | 1/2019 | Gupta | |
| 10,235,158 B2 | 3/2019 | Bershansky et al. | |
| 10,402,044 B2 | 9/2019 | Rose et al. | |
| 10,715,611 B2* | 7/2020 | Edwin | G06F 3/0231 |
| 11,451,043 B1* | 9/2022 | Olander | G01R 21/133 |
| 2003/0191730 A1* | 10/2003 | Adkins | G06F 9/453 |
| | | | 702/186 |
| 2008/0196000 A1* | 8/2008 | Fernandez-Ivern | G06Q 30/02 |
| | | | 717/101 |
| 2010/0211694 A1* | 8/2010 | Razmov et al. | H04L 67/535 |
| 2014/0089824 A1* | 3/2014 | George | G06F 11/3438 |
| | | | 715/762 |
| 2015/0205335 A1* | 7/2015 | Teshone et al. | G06F 1/3206 |
| 2019/0279080 A1* | 9/2019 | Rollat | G06N 3/08 |
| 2021/0011437 A1* | 1/2021 | Migneco | H04W 4/40 |
| 2021/0240588 A1 | 8/2021 | Balthazar de Lima Mussauer et al. | |
| 2021/0374569 A1* | 12/2021 | Jezewski | G06N 20/00 |

FOREIGN PATENT DOCUMENTS

| | | | | |
|---|---|---|---|---|
| CA | 3060877 C | * | 5/2020 | G06F 11/008 |
| CN | 102197662 A | * | 9/2011 | H04S 7/301 |
| CN | 102918470 A | * | 2/2013 | G05B 23/0283 |
| CN | 106779110 A | * | 5/2017 | |
| CN | 109769397 A | * | 5/2019 | G06F 21/32 |
| CN | 110265131 A | * | 9/2019 | A61B 5/02 |
| CN | 113113866 A | * | 7/2021 | |
| CN | 215581217 U | * | 1/2022 | |
| CN | 216113979 U | * | 3/2022 | |
| EP | 2784862 A1 | * | 10/2014 | H01M 8/04104 |
| JP | 2004154622 A | * | 6/2004 | B01D 53/56 |
| JP | 3809915 B2 | | 8/2006 | |
| WO | WO-2005116852 A2 | * | 12/2005 | G06F 16/60 |
| WO | WO-2009030247 A1 | * | 3/2009 | G06F 17/30864 |
| WO | WO-2013151908 A1 | * | 10/2013 | F24C 1/00 |
| WO | WO-2014159563 A1 | * | 10/2014 | G06F 21/316 |
| WO | 2019237332 A1 | | 12/2019 | |

* cited by examiner

UNEXPECTED DEVICE USAGE DETECTION AND ADAPTATION

BACKGROUND

The present invention relates to usage of electronic devices, and more specifically, to identifying and adapting to unexpected or damaging uses of electronic devices by users. Currently, hardware and software designers rely on extensive design testing and prototypes to produce electronic devices, which are expected to hold up under normal or expected wear and tear during utilization of the devices. However, human users are often unpredictable and use electronic devices in manners that are not anticipated or are outside of given design parameters for electronic devices. Failing to adapt electronic devices or user expectations for the use of the electronic devices may cause users to incidentally damage the electronic devices causing a decrease in the electronic device life expectancy and a loss of consumer confidence in the electronic device.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes receiving, at a utilization analysis system, device utilization information from an electronic device, applying, at the utilization analysis system, a utilization model to the device utilization information to determine at least one device usage pattern, and determining, from the at least one device usage pattern and design parameters for the electronic device, an unexpected device utilization of the electronic device not present in the design parameters. The method also includes determining, using the unexpected device utilization, one or more device optimization proposals including at least one of: a software enhancement executing on the electronic device, and a hardware enhancement for the electronic device. The method also includes deploying the one or more device optimization proposals to adapt the electronic device for the unexpected device utilization of the electronic device. Other embodiments of this aspect include corresponding computer systems, apparatus, and computer programs recorded on one or more computer storage devices, each configured to perform the actions of the methods.

One example embodiment includes a computer program product which includes a computer-readable storage medium having computer-readable program code embodied therewith, the computer-readable program code executable by one or more computer processors to perform an operation. The operation includes receiving, at a utilization analysis system, device utilization information from an electronic device, applying, at the utilization analysis system, a utilization model to the device utilization information to determine at least one device usage pattern, and determining, from the at least one device usage pattern and design parameters for the electronic device, an unexpected device utilization of the electronic device not present in the design parameters. The operation also includes determining, using the unexpected device utilization, one or more device optimization proposals including at least one of: a software enhancement executing on the electronic device, and a hardware enhancement for the electronic device. The operation also includes deploying the one or more device optimization proposals to adapt the electronic device for the unexpected device utilization of the electronic device.

Another example embodiment includes a system. The system includes one or more computer processors. The system also includes a memory containing a program which when executed by the computer processors performs an operation. The operation includes receiving, at a utilization analysis system, device utilization information from an electronic device, applying, at the utilization analysis system, a utilization model to the device utilization information to determine at least one device usage pattern, and determining, from the at least one device usage pattern and design parameters for the electronic device, an unexpected device utilization of the electronic device not present in the design parameters. The operation also includes determining, using the unexpected device utilization, one or more device optimization proposals including at least one of: a software enhancement executing on the electronic device, and a hardware enhancement for the electronic device. The operation also includes deploying the one or more device optimization proposals to adapt the electronic device for the unexpected device utilization of the electronic device.

DETAILED DESCRIPTION

Electronic devices are increasingly a ubiquitous part of life in both consumer and commercial forms. Humans use and rely on a variety of devices from personal consumer devices such as mobile phones, tablets, and other computing devices to Internet-of-Things (IoT) devices in both personal and industrial settings. For example, users often have a mobile smart phone within reach at all times, a smart watch on their wrist, and a variety of electronic devices at home ranging from smart televisions and computers, to many types of IoT devices that increasingly make up smart homes.

Additionally, commercial and industrial enterprises incorporate various electronic devices into a variety of retail, industrial, and other settings. For example, smart devices are used to aid workers and monitor commercial environments in a wide variety of commercial enterprises including retail, industrial, and other settings. In both the commercial setting and direct consumer settings, these electronic devices are designed within certain parameters that are meant to provide durable performance for the electronic device. While these electronic device designs often account for some extreme or damaging conditions, in some cases the electronic device designs cannot account for every utilization that the electronic device may encounter during use by the end user.

While some of these unexpected device utilizations may not cause increased wear and tear or damage to the device, many of the unexpected device utilizations can cause problems with the functions and cause the device to quickly deteriorate. In other examples, the unexpected device utilization may not cause any damage to the device and discovering these uses may be beneficial to the electronic device developers to further enhance the electronic device for additional advantageous uses and other development.

The systems and methods described herein provide increased visibility and insight into unexpected usage patterns for electronic devices. The system and methods include using a utilization analysis system to apply a utilization model to device utilization information. The utilization model is used to determine one or more device usage patterns for the electronic device. These device usage patterns are used to determine an unexpected device utilization where the system responds to the unexpected device utilization with several hardware and software solution proposals to prevent damage to the electronic device and/or enhance the design and development of the electronic device.

Figure 1:
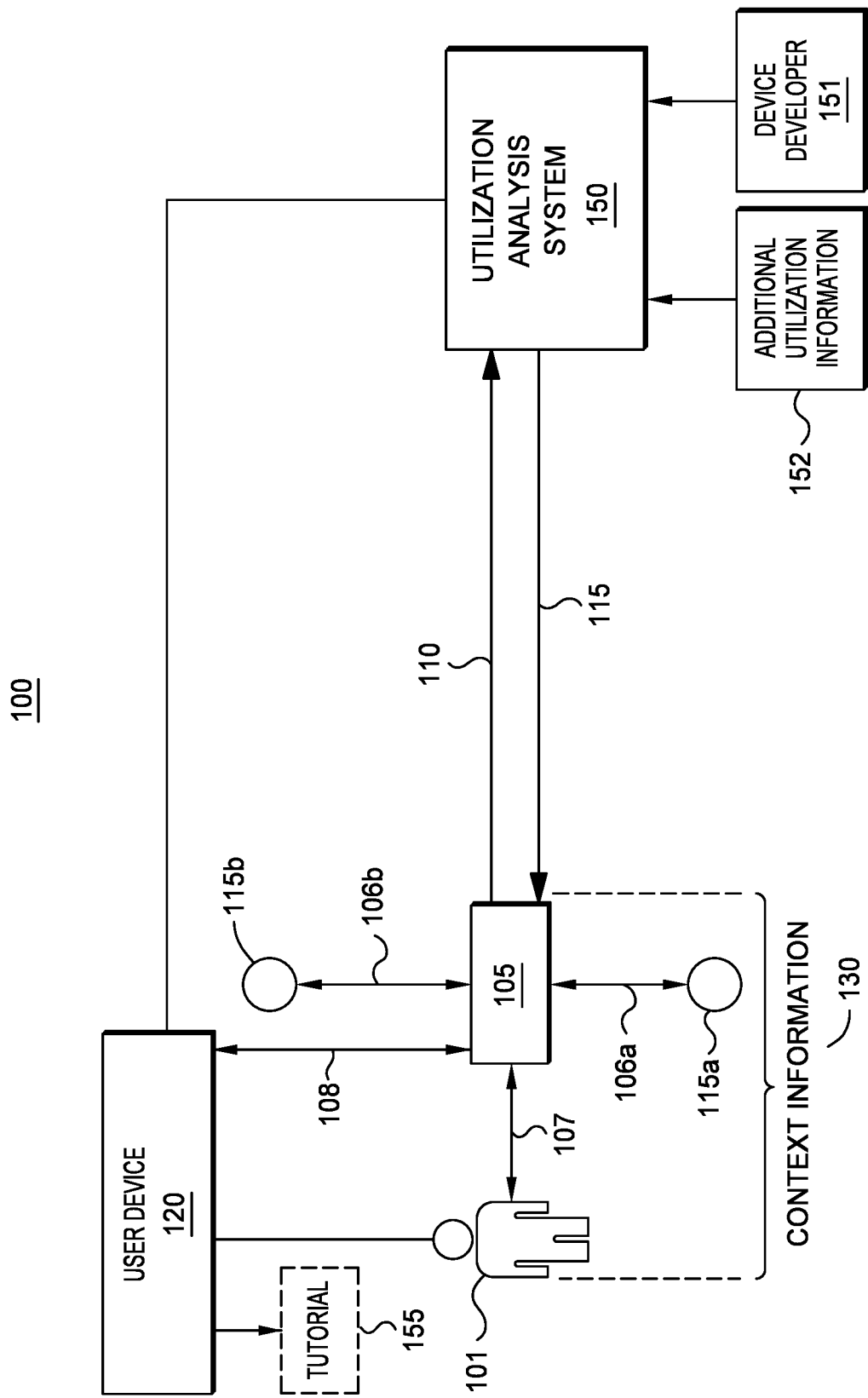
FIG. 1 illustrates an example electronic device and utilization analysis system, according to one embodiment.

FIG. 1 illustrates an example electronic device and utilization analysis system, according to one embodiment. The environment 100 includes a user 101 interacting with or using an electronic device 105 (device 105), where the device 105 is in communication with a utilization analysis system 150 (system 150). The user interacts with or otherwise manipulates the device 105 via interactions 107. In some cases, the interactions 107 may include a variety of expected device uses. For example, the user 101, may use a smart speaker (e.g., the device 105) in their home for expected/designed durations and contexts represented by context information 130. For example, the smart speaker may be in a typical location in the home such as a living room.

In another example, the user 101 may use the smart speaker in an unexpected manner or location (e.g., not within design parameters). For example, the smart speaker may be situated in a kitchen above a stove. In this example, the high heat and humidity associated with cooking may cause a deteriorating utilization of the device. For example, the speaker may appear to function normally for a period of time, but may be subjected to increased wear and tear such that the expected life of the speaker (e.g., 10 years of expected usage) is reduced (e.g., 2 years of damaging usage). In order to both address the interactions 107 as well as adapt further hardware developments to the interactions 107, the system 150 determines and deploys one or more device optimization proposals the device 105.

For example, the system 150 makes use of the expected consumer usage patterns and unexpected/hidden usage patterns for every consumer durable device in the smart home system and thereby derives insights and recommendations to software components and hardware component enhancements.

In a software component upgrade or enhancement instance, the system considers the valid unexpected/hidden usage pattern of the user and classifies the patterns as usability module enhancements, security module enhancements, or tracking/power module/firmware enhancements and may alert respective software development teams for better future releases for optimized usage and electricity generation.

In another example, for hardware component enhancements, the system 150 considers the usage patterns as well as the feedback from users derived from various platforms like social, IoT enabled devices, surveys/feedback given at service centers and/or other online platforms. This information is used to identify hardware enhancements or changes the end user is expecting in addition to existing core functionality.

In some examples, the device 105 may include any type of consumer, industrial, or other type of electronic device that includes sensors which provide context information for the device. Example devices may include a mobile smart phone, smart watch, tablet, computer, or other consumer devices. Additional devices may include IoT devices such as networked cameras, sensors, smart lightbulbs, smart locks, etc. While described herein in primarily consumer settings, the device 105 may also be utilized in commercial settings such as in retail environments, industrial settings, large scale data centers, and other commercial settings.

Figure 2:
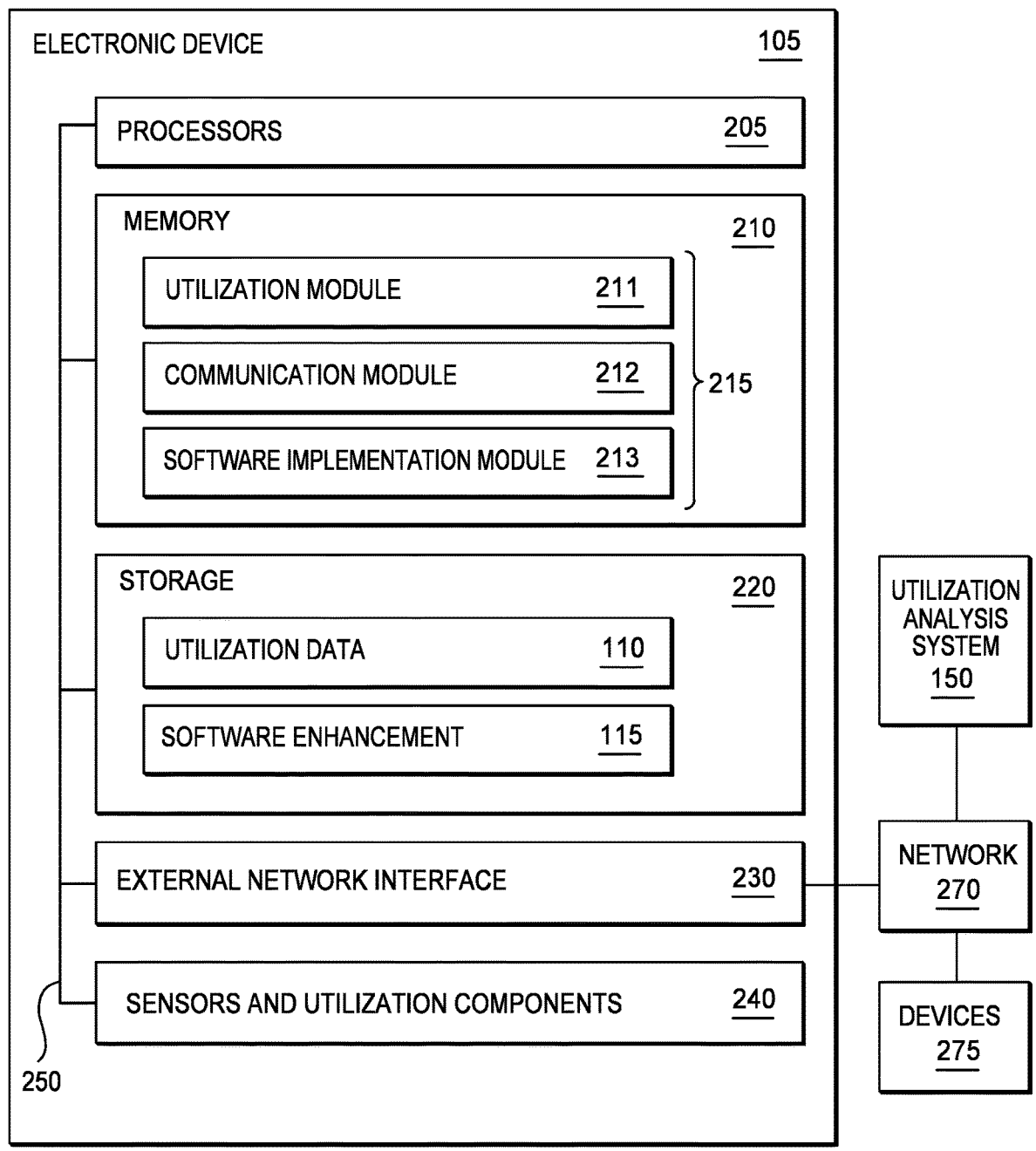
FIG. 2 illustrates a block diagram of an example electronic device, according to one embodiment.

In some examples, the device 105 includes components that collect various utilization and other device context data from onboard sensors as well as other devices in the network. For example, as shown in FIG. 2 the device 105 shown in arrangement 200 includes processors 205, memory 210, storage 220, an external network interface 230, sensor and utilization hardware components, components 240, and a bus 250 connecting the previously listed components. In some examples, the components 240 include various monitoring and context sensors and other hardware that provides context and utilization information for the device 105. For example, the utilization information may include a user manipulation of the electronic device during use of the electronic device collected via a gyroscope and other components that may detect an orientation and manipulation of the device by the user.

The utilization information may also include a device context including at least a location during use of the electronic device collected via a global positioning system or other location detection service provided by the components 240. The utilization information may also include a time and duration of use of the electronic device and an external device interaction during use of the electronic device. For example, the components 240 may detect interaction with devices external to the device 105, such as devices 275, where the devices 275 may also provide additional utilization and context information. The device 105 also includes program modules 215, including a utilization module 211, a communication module 212, and a software implementation module 213 which compiles the device utilization information as utilization data 110 and provides the utilization data 110 to the system 150 via the network 270 and implement a software enhancement 115 received from the system 150.

Returning back to FIG. 1, as discussed in relation to FIG. 2, additional devices 275 may provide additional context or other usage information. These devices may include various electronic devices such as IoT devices 115a and 115b, which provide utilization information 106a and 106b to the device 105 as well as user device 120, which provides utilization information 108 to the device 105. The utilization information 106a-b and 108 may provide context information 130 as well as additional information about the utilization and manipulation of the device by a user 101. For example, the IoT devices 115a and 115b may include temperature sensors, cameras, location beacons, and other typical IoT devices that can provide collect and provide additional location and context information. For example referring to the previous example of a smart speaker as device 105, the IoT devices 115a and 115b may provide location data to a smart speaker indicating the device 105 is in a kitchen and near a stove, as well as heat and humidity data for locations around the device 105.

In some examples, the user 101 may also provide additional utilization information representing the interactions 107 to the device 105 directly or via a user interface on the user device 120. For example, the device 105 may include a smart device (e.g., a smart speaker, etc.) that requires interaction via another smart device such as a smart phone (embodied as the user device 120). In some examples, the device 105 collects all of the related utilization data at the device itself and provides the utilization data 110 directly to the system 150. For example, the user 101 may manually provide the location and other utilization data to the device 105 and/or the user device 120.

As the device 105 collects and provides utilization data 110, the system 150 collects utilization data 110 from the device 110 as well additional utilization information 152 from other inputs and additional inputs from the device developer 151. In some examples, the additional utilization information 152 may include utilization information provided by a user of the electronic device (e.g., via the user device 120, via a feedback system, etc.). In some examples, additional utilization information includes information compiled by a service system representing usage by multiple various user. For example, users may frequently indicate using the device 105 in a certain context or in a certain manner in customer service interactions. In another example, utilization information may also be provided by a service forum, for example, a community sourced question/answer forum may also be used to determine typical utilization information for devices similar to the device 105.

The system 150 applies a utilization model to the utilization data 110 to determine at least one device usage pattern. In some examples, the utilization model uses various parameters to determine various contexts and usages of the device 105 based on the utilization data 110. In some examples, the determined usage pattern for a smart speaker may include various locations of use as well as performance of the device. For example, the usage pattern may show frequent high heat/high humidity usage for the smart speaker.

The system 150 also determines from the device usage pattern and design parameters for the device 105, an unexpected device utilization of the electronic device not present in the design parameters and, in turn, determines, using the unexpected device utilization, one or more device optimization proposals. The device optimization proposals may include a software enhancement for execution on the electronic device, and a hardware enhancement for the electronic device.

For example, the software enhancement may include any of an update to device firmware to adapt the electronic device to the unexpected device utilization, a program update to directly monitor device utilization information for the unexpected device utilization, and a user interaction update providing user information for the unexpected device utilization. For example, the smart speaker may be updated to adapt its usage when in damaging conditions in order to preserve vulnerable components. Additionally, the smart speaker may be updated to provide a notification to a user indicating a usage is damaging to the device via a direct notice or via the user device 120.

In some examples, the hardware enhancement may include an added hardware component to adapt the electronic device to the unexpected device utilization and a hardware design change to adapt future devices to the unexpected device utilization. For example, a hardware improvement for the smart speaker may include a proposal for case for the speaker when in damaging high heat and humidity conditions as well as a future update to the design of the speaker to incorporate hardware that is designed to outlast the damaging conditions.

In another, the software enhancement may also include a detailed instruction for a user to instruct on how to avoid damaging utilization of the device. For example, the system 150 may also generate a virtual instruction tutorial 155 demonstrating an optimum use of the electronic device, where the system 150 provides the virtual instruction tutorial 155 to a consumer such as the user 101 to inform the user 101 of the unexpected device utilization. In some examples, the virtual instruction tutorial 155 is provided via the device 105 or the user device 120, as described in further detail in relation to FIG. 4.

The system 150 deploys the one or more device optimization proposals to adapt the electronic device for the unexpected device utilization of the electronic device. For example, the system 150 provides the software enhancement 115 to the device 105 to update the software of the device. The system 150 may also provide the hardware enhancements to the device developer 151 in order to further adapt hardware for the device 105. The operations described above are described in further detail in relation to FIG. 3.

Figure 3:
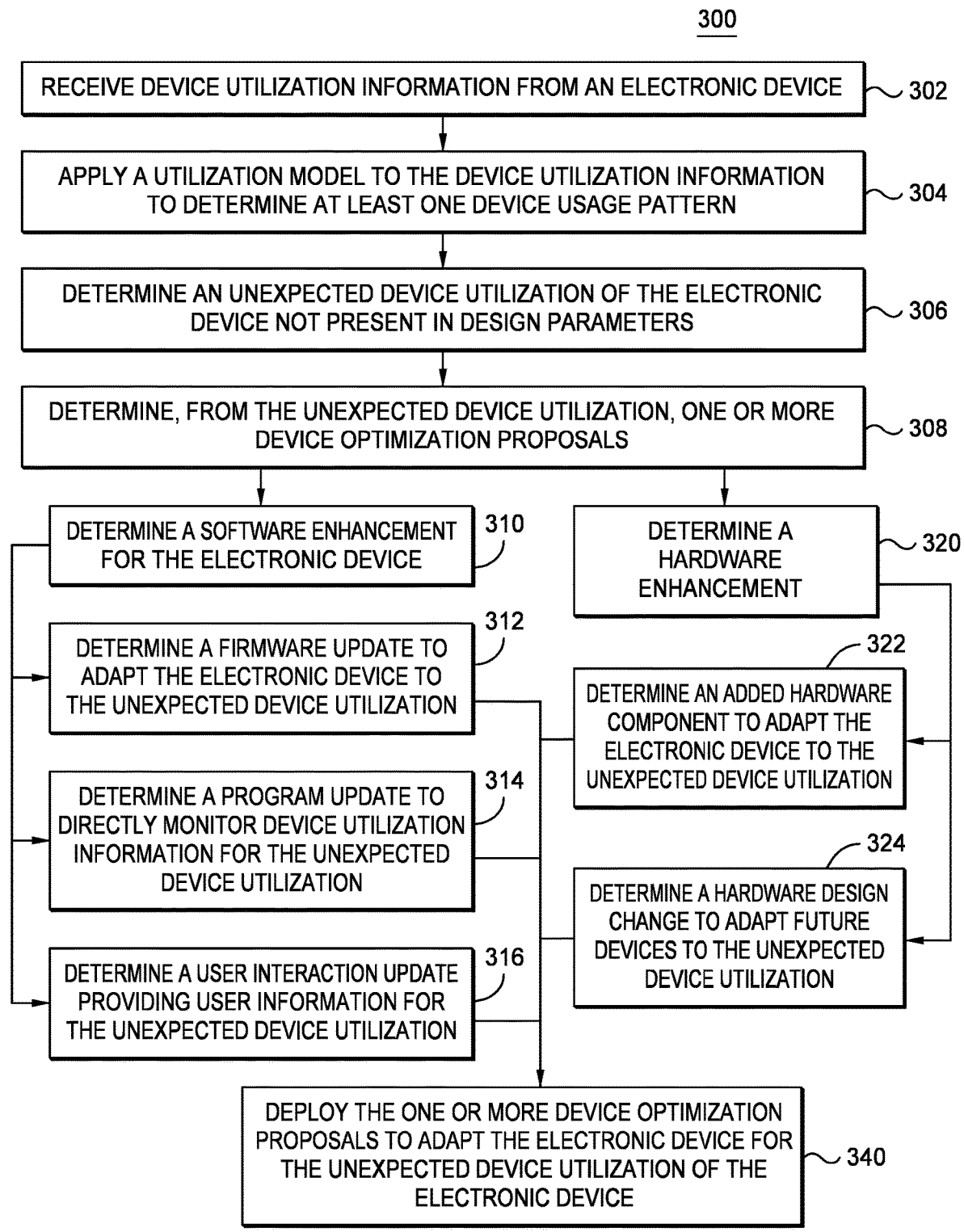
FIG. 3 illustrates a flowchart for determining one or more device optimization proposals, according to embodiments.

FIG. 3 illustrates a flowchart for determining one or more device optimization proposals, according to embodiments. For ease of discussion the methods described in FIG. 3 will refer the examples and systems described in FIGS. 1-2. The methods may also be performed by the system 150 described in FIG. 1 as well as FIG. 5. Method 300 begins at block 302, where the system 150 receives device utilization information from an electronic device. For example, the system 150 receive the utilization data 110 from the device 105, where the utilization data 110 includes a variety of context and usage data from the device 105. For example, the utilization data 110 may include a user manipulation of the electronic device during use of the electronic device. For example, how the user operates the device during use as collected by various components on the device 105. The utilization data 110 may also include a device context including at least a location during use of the electronic device. For example, the location may be a global location (e.g., country, state, locality) or a more specific location (e.g., in a home, retail environment, kitchen, conference room etc.).

In some examples, the utilization data 110 may also include a time and duration of use of the electronic device. For example, the utilization data 110 may include a time of day timestamp as well as how low the user is using the device per day or per use, etc. The utilization data 110 may also include an external device interaction during use of the electronic device. For example, any interactions between the device 105 and user device 120 or devices 115*a-b* may also be included in the utilization data 110.

In some examples, the utilization data 110 received from the device 105 may also be augmented by additional information received from the user device 120, additional utilization information 152, and device developer 151. This information may include utilization information provided directly by the user 101, utilization information compiled by a service system, and utilization information provided by a service forum among other forms of compiled utilization data.

At block 304 the system 150 applies a utilization model to the device utilization information to determine at least one device usage pattern. In some examples, the utilization model uses machine learning or other methods to correlate various factors in the utilization information in order to parse specific usage patterns. Referring back to the smart speaker example, the time of day and duration of use may be correlated with other use conditions such as high heat/humidity indicating that the speaker is used during meal preparation and located close to cooking apparatuses. In some examples, the utilization model may further use additional information provided by the additional utilization information 152 and the device developer 151 to identify edge cases of usage that happens frequently and/or infrequently to identify a wide variety of uses.

At block 306, the system 150 determines, from the at least one device usage pattern and design parameters for the electronic device, an unexpected device utilization of the electronic device not present in the design parameters. The design parameters may include various expected utilizations including expected damaging uses of the device. For example, the smart speaker may include typical operating conditions expected for the device as well as short term damaging conditions expected for the device 105. When one or more of the usage patterns identified in block 304 falls outside of the design parameters (e.g., exceeds the typical operating conditions) the system 150 flags the usage pattern as an unexpected device utilization.

For example, the device 105 may include a refrigerator, oven, or other smart device related to food storage. In some examples, usage (including food stored/cooked in the device) may affect the sensors which may be undetectable immediately but cause increased damages overtime. In another example, a smart watch/mobile device sanitized with an alcohol based sanitizer could affect its durability over a long time frame.

In some examples, the unexpected device utilization includes at least one of: a user manipulation of the electronic device during use of the electronic device, a device context comprising at least a location during use of the electronic device, a time and duration of use of the electronic device, an external device interaction during use of the electronic device. In some cases, the unexpected device utilization is a deteriorating utilization of the electronic device causing at least an accelerated deterioration of the electronic device. The deteriorating utilization may include increased wear and tear from faulty, incorrect usage or less than optimum usage.

In some examples, the unexpected device utilization may include uses that do not cause damage to the device, but are also not expected uses. For example, a smart speaker may be used in way that is not typically expected (e.g., as part of intercom system, etc.) that does not cause increased wear and tear on the device. In some examples, the unexpected device utilization of current device with and external device might be a new usage pattern which is unrelated to wear and instead enhances usability, which in turn builds the customer satisfaction. For example, a user watching cooking videos while operating a refrigerator may indicate to the refrigerator manufacture to enable this option on a smart screen on the refrigerator. In this case, the system 150 will identify firmware upgrades, etc. and notify the firmware manufacturer.

At block 308, the system 150 determines, using the unexpected device utilization, one or more device optimization proposals. In some examples the optimization proposals include a software enhancement executing on the electronic device, and/or a hardware enhancement for the electronic device. For example, the system uses the unexpected device utilization and the device design in order to determine various optimization proposals.

In one example, the method 300 proceeds to block 310 to determine a software enhancement for the electronic device. In some examples, the software enhancements include determine various enhancements at blocks 312, 314, and 316. For example, at block 312 the system 150 determines a firmware update to adapt the electronic device to the unexpected device utilization. The firmware update may include a change to the firmware of the device 105 in order to preserve the device during an unexpected device utilization. In an example where the device utilization is not damaging, the firmware update may further optimize or adapt the device 105 behavior during the unexpected utilization.

At block 314, the system 150 determines a program update to directly monitor device utilization information for the unexpected device utilization. For example, a new program or program update for the device 105 may be initiated in order to further monitor the usage of the device during the unexpected utilization. In some examples, the program update also preserves the device 105 during the unexpected utilization. In another example, the program provides increased monitoring capabilities in order to provide more focused or granular information for the device 105 during an unexpected use.

At block 316 the system 150 determines a user interaction update providing user information for the unexpected device utilization. The user interaction update may include a direct notification via the device 105 or the user device 120 of the unexpected usage and mitigation efforts to prevent any damage from the device utilization. In some examples, the user interaction update may include a simple alert indicating a utilization is causing damage (e.g., pressure, force applied, weight loaded, temperature and/or location is causing damage, etc.). In another example, the user interaction update may include more detailed information or tutorial, such as virtual instruction tutorial 155, as described in further detail in relation to FIG. 4.

While shown as separate steps in FIG. 3, one or more of the blocks 312-316 may be performed simultaneously as separate or combined components of a software enhancement. Additionally, the software enhancements may also be determined with hardware enhancements as described in relation to blocks 320-324.

In one example, the method 300 proceeds to block 320 to determine a hardware enhancement for the electronic device. In some examples, the hardware enhancements include determining various enhancements at blocks 322 and 324. For example, at block 322 the system 150 determines an added hardware component to adapt the electronic device to the unexpected device utilization. In some examples, the added hardware component may include a physical addition to the device 105 which adapts the device to the unexpected utilization.

At block 324, the system 150 determines a hardware design change to adapt future devices to the unexpected device utilization. For example, the hardware design change may include one or more changes to the configuration/components of the device 105 in order to adapt the device for future design iterations of the device.

At block 340, the system 150 deploys the one or more device optimization proposals to adapt the electronic device for the unexpected device utilization of the electronic device. For the software enhancements, the system 150 may install various firmware and software updates on the device 105 as well as provide information to the user 101 to inform the user of the unexpected utilization. For the hardware enhancements, the system 150 may provide the hardware enhancements to the device developer as well as information on the hardware enhancements to the users in order to deploy any hardware fixes needed to address the unexpected utilization.

Figure 4:
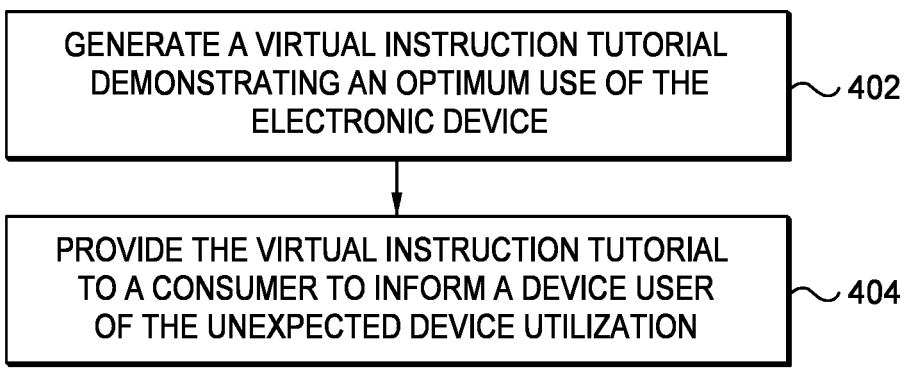
FIG. 4 illustrates a flowchart for determining one or more device optimization proposals, according to embodiments.

FIG. 4 illustrates a flowchart for determining one or more device optimization proposals, according to embodiments. In some examples, the system 150 uses the hidden/unexpected usage patterns of the user 101, as well as known current product/device usage or functionality and user expectation, generate virtual instruction tutorial may include virtual reality (VR)/augmented reality (AR) content for the device 105 for immediate presentation to a user when used in a non-optimized manner.

For example, method 400 begins at block 402, where the system 150 generates a virtual instruction tutorial demonstrating an optimum use of the electronic device. In some examples, the virtual instruction tutorial 155 includes VR/AR components that are provided to the user via the device 105 or via the user device 120. The virtual instruction tutorial 155 may include various instructions to the user 101 on how to use the device without causing damage to the device from the unexpected usage patterns. In another example, the virtual instruction tutorial 155 may also include information on how to upgrade the hardware according to the hardware enhancements generated by the system 150. For example, for a device 105 that is in use in a retail environment, when an unexpected damaging use is detected by the system 150, a tutorial is generated for the employees of the retail environment in order to train them to avoid or adapt to the unexpected damaging use of the electronic device.

Additionally, the virtual instruction tutorial 155 may also be provided to potential users of the device in order to instruct and teach on how to properly utilize the device. For example, a potential user may access the virtual instruction tutorial 155 prior to purchasing the device 105 in order to determine whether their intended use is compatible with the device 105 or they can adapt their behavior to avoid the damaging use of the device.

At block 404, the system 150 provides the virtual instruction tutorial to a consumer to inform a device user of the unexpected device utilization. As described above, the virtual instruction tutorial 155 may be provided via the device 105, the devices 115a-115b, and user device 120, or a combination of any of these devices in order to instruct and inform the user 101 and others on avoiding or adapting to any damaging unexpected usages of the device. For example, a potential customer may receive the virtual instruction tutorial 155 prior to purchasing the device 105 in order to determine whether their intended use is compatible with the device 105 or they can adapt their behavior to avoid the damaging use of the device or whether to purchase the device.

Figure 5:
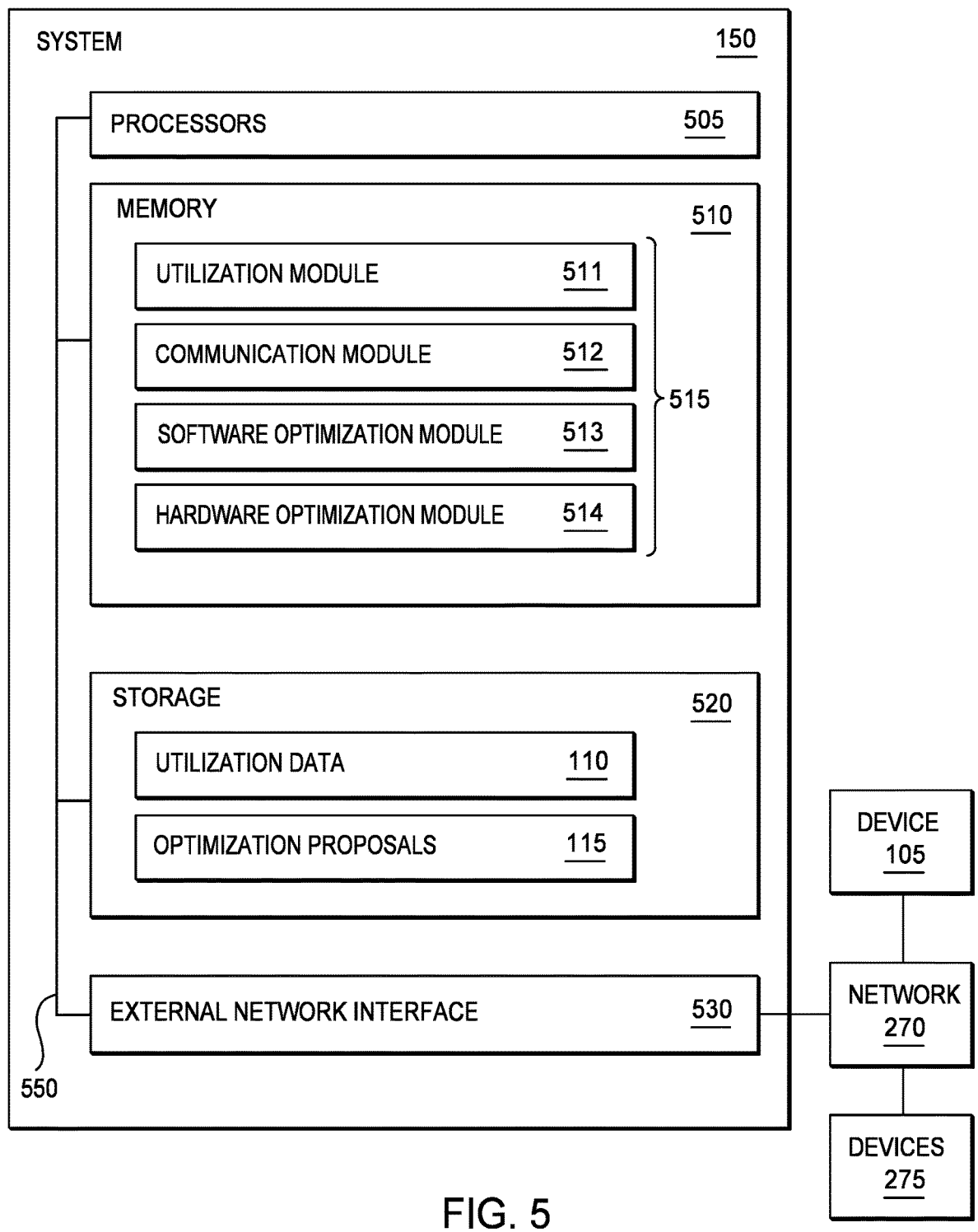
FIG. 5 illustrates a block diagram of a utilization analysis system, according to one embodiment.

FIG. 5 illustrates a block diagram of a system 150, according to one embodiment. The system 150 is shown in the form of a general-purpose computing device. The components of system 150 may include, but are not limited to, one or more processing units or processors 505, a memory 510, a storage system 520, network interface 530, and a bus 550 that couples various system components including the memory 510 and storage system 520 to processors 505. In other embodiments, arrangement 500 is distributed and includes a plurality of discrete computing devices that are connected through wired or wireless networking.

Bus 550 (as well as bus 250) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System 150 typically includes a variety of computer system readable media. Such media may be any available media that is accessible by the system 150, and it includes both volatile and non-volatile media, removable and non-removable media. Memory 510 (as well as memory 210) can include computer system readable media in the form of volatile memory, such as random access memory (RAM) and/or cache memory. The system 150 may further include other removable/non-removable, volatile/non-volatile computer system storage media. By way of example, storage system 520 (as well as storage system 520) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. As will be further depicted and described below, memory 510 may include at least one program product having a set (e.g., at least one) of program modules that are configured to carry out the functions of embodiments of this disclosure.

System 150 may further include other removable/non-removable, volatile/non-volatile computer system storage media. In some examples, storage system 520 may be included as part of memory 510 and may typically provide a non-volatile memory for the networked computing devices, and may include one or more different storage elements such as Flash memory, a hard disk drive, a solid state drive, an optical storage device, and/or a magnetic storage device. For example, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. The storage system 520 may be updated and accessed by program modules 515 described herein.

Additionally, system 150 may communicate with one or more networks such as a local area network (LAN), a general wide area network (WAN), and/or a public network (e.g., the Internet) via network interface 530. As depicted, network interface 530 communicates with the other components of system 150 via bus 550. It should be understood that although not shown, other hardware and/or software components could be used in conjunction with system 150. Examples, include, but are not limited to: cloud computing systems, microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the system 150) or related data available in the cloud. For example, the system 150 could execute on a computing system in the cloud. In such a case, the system may determine unexpected device utilizations and optimization proposals at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving, at a utilization analysis system, device utilization information from an electronic device, wherein the device utilization information comprises environmental condition information received from one or more sensors onboard the electronic device;
applying, at the utilization analysis system, a utilization model to the device utilization information to determine at least one device usage pattern;
determining, from the at least one device usage pattern, the environmental condition information, and design parameters for the electronic device, an unexpected device utilization of the electronic device not present in the design parameters, wherein the design parameters comprise a plurality of expected device utilizations for the electronic device, wherein the plurality of expected device utilizations comprise at least one expected deteriorating utilization of the electronic device, wherein the unexpected device utilization comprises a deteriorating utilization not present in the at least one expected deteriorating utilization of the electronic device;
determining, using the unexpected device utilization, one or more device optimization proposals comprising at least one of:
a software enhancement executing on the electronic device, or
a hardware enhancement for the electronic device; and
deploying the one or more device optimization proposals to adapt the electronic device for the unexpected device utilization of the electronic device by performing at least one of:
installing the software enhancement to the electronic device via a network connection to the electronic device; and
providing an indication of the hardware enhancement to one or more of a user and developer of the electronic device via the network connection.

2. The method of claim 1, wherein the unexpected device utilization causes at least an accelerated deterioration of the electronic device, and wherein the unexpected device utilization comprises at least one of:
a user manipulation of the electronic device during use of the electronic device,
a device context comprising at least a location during use of the electronic device,
a time and duration of use of the electronic device, or
an external device interaction during use of the electronic device.

3. The method of claim 1 wherein the software enhancement comprises at least one of:
a firmware update to adapt the electronic device to the unexpected device utilization;
a program update to directly monitor device utilization information for the unexpected device utilization; or
a user interaction update providing user information for the unexpected device utilization.

4. The method of claim 1 wherein the hardware enhancement comprises at least one of:
an added hardware component to adapt the electronic device to the unexpected device utilization; and
a hardware design change to adapt future devices to the unexpected device utilization.

5. The method of claim 1, further comprising:
generating a virtual instruction tutorial demonstrating at least one of an optimum use of the electronic device and how to avoid damaging usage of the device; and
providing the virtual instruction tutorial to a consumer to inform a device user of the unexpected device utilization.

6. The method of claim 1, wherein the device utilization information further comprises at least one of:
   utilization information provided by a user of the electronic device;
   utilization information compiled by a service system; and
   utilization information provided by a service forum.

7. The method of claim 1, wherein the device utilization information further comprises context information provided by one or more context collection devices external to the electronic device.

8. A computer program product, the computer program product comprising:
   a non-transitory computer-readable storage medium having computer-readable program code embodied therewith, the computer-readable program code executable by one or more computer processors to perform an operation comprising:
      receiving, at a utilization analysis system, device utilization information from an electronic device, wherein the device utilization information comprises environmental condition information received from one or more sensors onboard the electronic device;
      applying, at the utilization analysis system, a utilization model to the device utilization information to determine at least one device usage pattern;
      determining, from the at least one device usage pattern, the environmental condition information, and design parameters for the electronic device, an unexpected device utilization of the electronic device not present in the design parameters, wherein the design parameters comprise a plurality of expected device utilizations for the electronic device, wherein the plurality of expected device utilizations comprise at least one expected deteriorating utilization of the electronic device, wherein the unexpected device utilization comprises a deteriorating utilization not present in the at least one deteriorating utilization of the electronic device;
      determining, using the unexpected device utilization, one or more device optimization proposals comprising at least one of:
         a software enhancement executing on the electronic device, and
         a hardware enhancement for the electronic device; and
      deploying the one or more device optimization proposals to adapt the electronic device for the unexpected device utilization of the electronic device by performing at least one of:
      installing the software enhancement to the electronic device via a network connection to the electronic device; and
      providing an indication of the hardware enhancement to one or more of a user and developer of the electronic device via the network connection.

9. The computer program product of claim 8, causes at least an accelerated deterioration of the electronic device, and wherein the unexpected device utilization comprises at least one of:
   a user manipulation of the electronic device during use of the electronic device,
   a device context comprising at least a location during use of the electronic device,
   a time and duration of use of the electronic device, or
   an external device interaction during use of the electronic device.

10. The computer program product of claim 8, wherein the software enhancement comprises one or more of:
   a firmware update to adapt the electronic device to the unexpected device utilization;
   a program update to directly monitor device utilization information for the unexpected device utilization; and
   a user interaction update providing user information for the unexpected device utilization.

11. The computer program product of claim 8, wherein the hardware enhancement comprises one or more of:
   an added hardware component to adapt the electronic device to the unexpected device utilization; and
   a hardware design change to adapt future devices to the unexpected device utilization.

12. The computer program product of claim 8, wherein the operation further comprises:
   generating a virtual instruction tutorial demonstrating at least one of an optimum use of the electronic device and how to avoid damaging usage of the device; and
   providing the virtual instruction tutorial to a consumer to inform a device user of the unexpected device utilization.

13. The computer program product of claim 8, wherein the device utilization information further comprises one or more of:
   utilization information provided by a user of the electronic device;
   utilization information compiled by a service system; and
   utilization information provided by a service forum.

14. The computer program product of claim 8, wherein the device utilization information further comprises context information provided by one or more context collection devices external to the electronic device.

15. A system comprising:
   one or more computer processors; and
   a memory containing a program which when executed by the computer processors performs an operation comprising:
      receiving, at a utilization analysis system, device utilization information from an electronic device, wherein the device utilization information comprises environmental condition information received from one or more sensors onboard the electronic device;
      applying, at the utilization analysis system, a utilization model to the device utilization information to determine at least one device usage pattern;
      determining, from the at least one device usage pattern, the environmental condition information, and design parameters for the electronic device, an unexpected device utilization of the electronic device not present in the design parameters, wherein the design parameters comprise a plurality of expected device utilizations for the electronic device, wherein the plurality of expected device utilizations comprise at least one expected deteriorating utilization of the electronic device, wherein the unexpected device utilization comprises a deteriorating utilization not present in the at least one expected deteriorating utilization of the electronic device;
      determining, using the unexpected device utilization, one or more device optimization proposals comprising at least one of:
         a software enhancement executing on the electronic device, and
         a hardware enhancement for the electronic device; and deploying the one or more device optimization proposals to adapt the electronic device for the unexpected device utilization of the electronic device by performing at least one of:

installing the software enhancement to the electronic device via a network connection to the electronic device; and providing an indication of the hardware enhancement to one or more of a user and developer of the electronic device via the network connection.

16. The system of claim 15, wherein the unexpected device utilization causes at least an accelerated deterioration of the electronic device, and wherein the unexpected device utilization comprises at least one of:

a user manipulation of the electronic device during use of the electronic device, a device context comprising at least a location during use of the electronic device, a time and duration of use of the electronic device, or an external device interaction during use of the electronic device.

17. The system of claim 15, wherein the software enhancement comprises one or more of:

a firmware update to adapt the electronic device to the unexpected device utilization;

a program update to directly monitor device utilization information for the unexpected device utilization; and a user interaction update providing user information for the unexpected device utilization.

18. The system of claim 15, wherein the hardware enhancement comprises one or more of:

an added hardware component to adapt the electronic device to the unexpected device utilization; and a hardware design change to adapt future devices to the unexpected device utilization.

19. The system of claim 15, wherein the operation further comprises:

generating a virtual instruction tutorial demonstrating at least one of an optimum use of the electronic device and how to avoid damaging usage of the device; and providing the virtual instruction tutorial to a consumer to inform a device user of the unexpected device utilization.

20. The system of claim 15, wherein the device utilization information further comprises one or more of:

utilization information provided by a user of the electronic device;

utilization information compiled by a service system; and utilization information provided by a service forum.

* * * * *